(12) United States Patent
Maalioune

(10) Patent No.: US 8,692,489 B2
(45) Date of Patent: Apr. 8, 2014

(54) SYSTEM FOR CONTROLLING AN ELECTRICAL DEVICE OF A NACELLE

(71) Applicant: Aircelle, Gonfreville l'Orcher (FR)

(72) Inventor: Hakim Maalioune, Orgeval (FR)

(73) Assignee: Aircelle, Gonfreville l'Orcher (FR)

( * ) Notice: Subject to any disclaimer, the term of this patent is extended or adjusted under 35 U.S.C. 154(b) by 0 days.

(21) Appl. No.: 13/649,368

(22) Filed: Oct. 11, 2012

(65) Prior Publication Data

US 2013/0033204 A1 Feb. 7, 2013

Related U.S. Application Data

(63) Continuation of application No. PCT/FR2011/050797, filed on Apr. 8, 2011.

(30) Foreign Application Priority Data

Apr. 12, 2010 (FR) ..................... 10 52741

(51) Int. Cl.
*H02P 3/14* (2006.01)

(52) U.S. Cl.
USPC ........... 318/376; 318/362; 318/372; 318/375; 318/430; 244/110 A; 244/110 B; 244/110 H; 244/12.4; 244/12.5; 303/152

(58) Field of Classification Search
USPC ................. 318/580, 583, 599, 34, 152, 156, 318/400.06, 376, 375, 362, 372, 430, 437; 363/50; 307/43, 125; 244/99.2, 75.1, 244/76 A, 12.4, 110 A, 110 B, 110 H, 12.5, 244/23 A, 221; 180/9.1; 303/126, 142, 152
See application file for complete search history.

(56) References Cited

U.S. PATENT DOCUMENTS

| | | | |
|---|---|---|---|
| 6,439,504 B1 * | 8/2002 | Ahrendt | 244/110 B |
| 7,093,424 B2 * | 8/2006 | Hanlon et al. | 60/226.2 |
| 8,164,283 B2 * | 4/2012 | Sheahan et al. | 318/376 |
| 2002/0157376 A1 | 10/2002 | Ahrendt | |
| 2006/0108867 A1 * | 5/2006 | Ralea | 303/152 |

FOREIGN PATENT DOCUMENTS

| | | |
|---|---|---|
| FR | 2920201 | 2/2009 |
| WO | 03/010430 | 2/2003 |

OTHER PUBLICATIONS

PCT/FR2011/050797 International Search Report.

* cited by examiner

*Primary Examiner* — Antony M Paul
(74) *Attorney, Agent, or Firm* — Brinks Gilson & Lione

(57) ABSTRACT

A control system for controlling an electrical device of a nacelle, the device having at least one element that is movable to a closed position and an open position. The control system includes at least one electromechanical member for actuating the movable element, a unit for electrically driving the electromechanical actuation member, and a controlling and monitoring unit for controlling the electrical drive unit so as to move the movable element to the closed and/or open position. The control system further includes a system for recovering braking power from the electrical drive unit during the movement of the movable element to the closed and/or open position.

11 Claims, 1 Drawing Sheet

SYSTEM FOR CONTROLLING AN ELECTRICAL DEVICE OF A NACELLE

CROSS-REFERENCE TO RELATED APPLICATIONS

Figure 1:
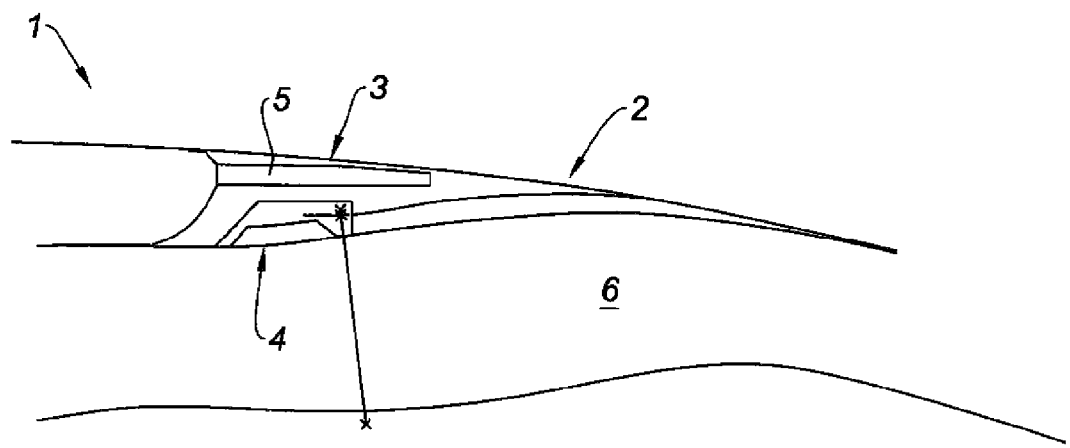

This application is a continuation of International Application No. PCT/FR2011/050797 filed on Apr. 8, 2011, which claims the benefit of FR 10/52741, filed on Apr. 12, 2010. The disclosures of the above applications are incorporated herein by reference.

FIELD

The present disclosure relates to a system for controlling an electrical device of an aircraft nacelle. The disclosure also relates to a nacelle comprising such a system and a method implemented by such a system.

BACKGROUND

The statements in this section merely provide background information related to the present disclosure and may not constitute prior art.

An airplane is moved by several turbojet engines each housed in a nacelle also housing a set of related actuating devices related to its operation and performing various functions when the turbojet engine is running or stopped.

These related actuating devices in particular include a mechanical thrust reverser system.

More specifically, a nacelle generally has a tubular structure comprising an air intake upstream of the turbojet engine, a middle section designed to surround a fan of the turbojet engine, a downstream section housing the thrust reverser means and designed to surround the combustion chamber of the turbojet engine, and generally ends with a jet nozzle situated downstream of the turbojet engine.

This nacelle is designed to house a dual flow turbojet engine capable of generating, through the rotating blades of the fan, a hot air flow, coming from the combustion chamber of the turbojet engine, and a cold air flow that circulates outside the turbojet engine through an annular tunnel.

The thrust reverser device is designed to improve the braking capacity of the aircraft during landing thereof by reorienting at least part of the thrust generated by the turbojet engine forward.

In that phase, the thrust reverser device obstructs the cold air flow tunnel and orients the latter toward the front of the nacelle, thereby generating a counter-thrust that is added to the braking of the wheels of the aircraft, the means implemented to perform that reorientation of the cold air flow varying depending on the type of reverser.

Different types of thrust reverser devices are generally known.

One embodiment of the latter provides that it comprises at least one element that can be moved between a closed position (stow phase) and an open position (deploy phase) cooperating in the open position to produce the thrust reversal, and at least one set of electromechanical handling members to maneuver the movable element between the closed and open positions.

The movable element may, in non-limiting examples, be a nacelle cowl, doors and/or reverser flaps upstream or downstream of the cowl of the nacelle.

The set of electromechanical handling members essentially includes electric actuators designed to actuate the movable elements and at least one electrical lock, called primary lock.

One aspect of these nacelles using electric devices is the management of the monitoring and control of these different devices of the nacelle.

The set of electromechanical handling members for maneuvering the movable elements between their closed and open positions of the thrust reverser are thus actuated by at least one rotary electric machine according to the design of the system and driven by at least one electronic controller housing of the ETRAS (Electrical Thrust Reverser Actuation Controller) type electrically connected to an engine controller of the FADEC (Full Authority Digital Engine Control) type designed to control and monitor the corresponding turbojet engine.

It has been noted, in direct jet and reversed jet, that the rotary electric machine goes into engine mode for the startup thereof so as to overcome the various forces of the system of the friction and aerodynamic force type, and, at the end of travel of the movable elements, it goes into generator mode.

The energy from the rotary electric machine connected to the braking when the latter becomes a generator is then thwarted, since it is dissipated in a discharge element such as a discharge resistance.

However, the dissipation may pose thermal problems.

The power components related to the control (power transistor, status copy, for example) must then include a plate to dissipate the energy.

However, this plate has a significant impact on the mass of the electronics and makes the assembly of electronic components on the corresponding boards more complex.

The dissipation may also pose problems of oversizing the electronic controller housing taking the amount of energy released into account.

SUMMARY

One aspect of the present disclosure is to improve the management and distribution of the electrical energy in a nacelle, as well as the overall energy efficiency of the nacelle.

It is also desirable to decrease the withdrawal of electrical energy on the power system of the aircraft, given the significant mass of the harnesses and the optimization of the electrical core of the aircraft.

Another aim of the present disclosure is to increase the reliability of the electronic control housing of the devices of the nacelle and to reduce the mass thereof.

To that end, the invention proposes a system for controlling an electrical device of a nacelle, said device comprising at least one element that is movable to a closed position and an open position, the control system including at least one electromechanical member for actuating said movable element, a unit for electrically driving said electromechanical actuation member, and a controlling and monitoring unit for controlling the electrical drive unit so as to move the movable element to the closed and/or open position, characterized in that it also includes a system for recovering braking power from said electrical drive unit during the movement of the movable element to the closed and/or open position.

Owing to the present invention, the control system reuses the braking energy from the drive unit as driving energy source.

The withdrawal of electrical energy from the power supply system of the aircraft is thus reduced, and the management of the nacelle's energy is improved.

According to specific embodiments of the present disclosure, a control system may include one or more of the following features, considered alone or in any technically possible combinations:

the energy recovery system includes at least one electrical circuit including an electrical storage device connected to the electrical drive unit;

the energy recovery system includes two identical electrical circuits each including at least one electrical storage device connected to the electrical drive unit;

each circuit also includes a switch with two states, one of the two states being adapted to connect the electrical drive unit to the energy storage device;

the control and monitoring unit is capable of controlling a braking energy recovery circuit as long as the maximum load of the energy storage device(s) is not reached, and controlling a braking energy dissipation circuit when the maximum load of the energy storage device(s) is reached;

the control and monitoring unit is capable of controlling a drive circuit in which the stored braking energy is discharged before an electrical withdrawal on an external electrical power supply system;

the control and monitoring unit is capable of controlling a circuit in which braking energy is dissipated in the electrical drive unit;

the electrical energy storage unit is a capacitor, a supercapacitor, or an ultracapacitor;

the electrical device is a thrust reverser device.

The invention also relates to a nacelle including at least one electrical device and control system as cited above.

The invention also relates to a control method implemented by a control system as previously cited, including a step in which the electrical braking energy is recovered from the electrical drive unit during the movement of the movable element to the closed position and/or the open position.

According to specific embodiments of the invention, a method according to the invention may include the following feature:

the device being a thrust reverser device, the electrical braking energy is recovered from the electrical drive unit during movement of the movable element to the closed position in direct jet operation of the thrust reverser device and/or to the open position in reversed jet operation of the thrust reverser device.

Further areas of applicability will become apparent from the description provided herein. It should be understood that the description and specific examples are intended for purposes of illustration only and are not intended to limit the scope of the present disclosure

DRAWINGS

The drawings described herein are for illustration purposes only and are not intended to limit the scope of the present disclosure in any way.

Figure 2:
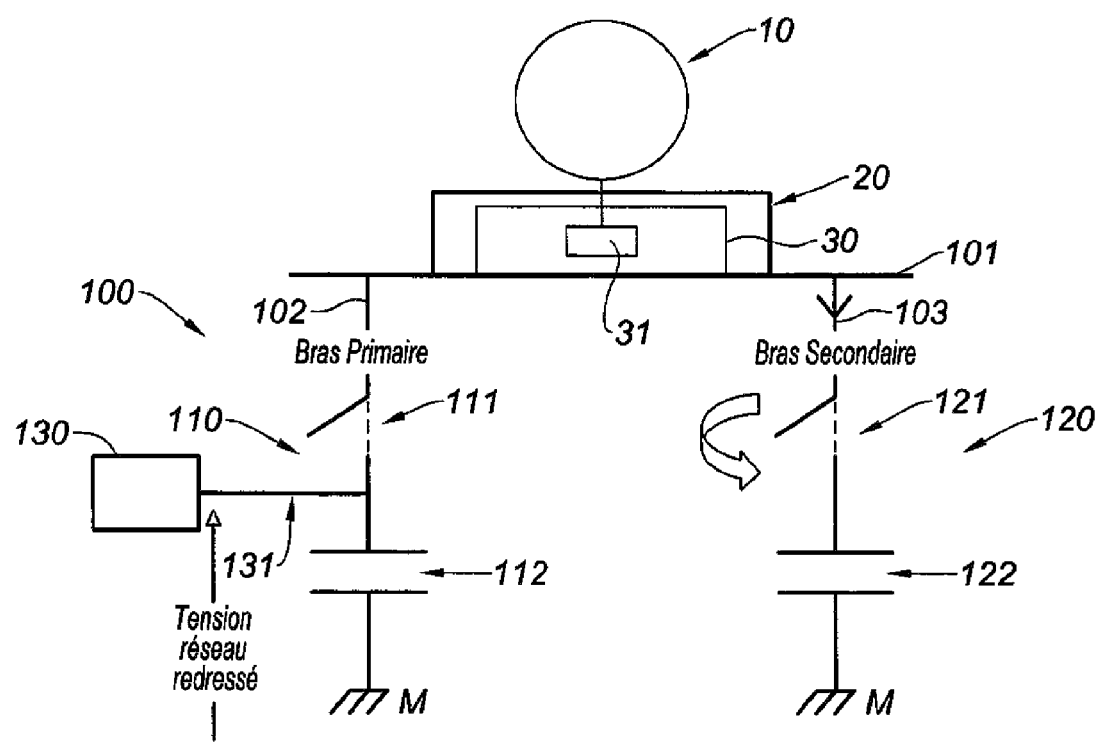

FIG. 1 is a cross-sectional view of one embodiment of a thrust reverser device; and FIG. 2 is a block diagram of a control system for a thrust reverser device of an aircraft according to one embodiment of the present disclosure.

DETAILED DESCRIPTION

The following description is merely exemplary in nature and is not intended to limit the present disclosure, application, or uses. It should be understood that throughout the drawings, corresponding reference numerals indicate like or corresponding parts and features. It should also be understood that various cross-hatching patterns used in the drawings are not intended to limit the specific materials that may be employed with the present disclosure. The cross-hatching patterns are merely exemplary of preferable materials or are used to distinguish between adjacent or mating components illustrated within the drawings for purposes of clarity.

In reference to FIG. 1, a nacelle 1 includes an electric thrust reverser device, designated by general reference 2.

This thrust reverser device 2 includes at least one element movable between a closed position (stow phase) and an open position (deploy phase) cooperating in the open position to produce the thrust reversal.

In one non-limiting embodiment of FIG. 1 of a cascading vane thrust reverser device, the movable elements are a cowl 3 movable between a deployed position, in which it opens a passage in the nacelle for the deflected airflow, on the one hand, and a retracted position, in which it closes that passage, on the other hand.

The air flow is reoriented by the cascade vanes 5, associated with second movable elements, i.e. reverser flaps 4 upstream of the cowl 3, the cowl 3 only having a simple sliding function intended to expose or cover said cascade vanes 5.

The reverser flaps 4 form blocking doors that may be activated by the sliding of the cowl 3 causing the cold flow tunnel 6 to close downstream of the vanes 5, so as to improve the reorientation of the cold air flow.

It should be noted that the thrust reverser device is in no way limited to that illustrated in this figure, and may be any known thrust reverser device, in particular a thrust reverser device with reverser doors or flaps downstream of the cowl of the nacelle.

The control system for the movable elements 3, 4 is currently made up of at least one set of electromechanical maneuvering members (not shown) to maneuver the movable elements 3, 4 between their closed and open positions of the thrust reverser device 2.

The set of electromechanical handling members essentially comprises electrical actuators designed to actuate the movable elements 3, 4, at least one electric lock, called primary lock, for retaining each movable element 3, 4, and status detectors and sensors for the handling members and the movable elements of the thrust reverser device.

The sensors may include position and/or proximity sensors.

The thrust reverser device may, in a known manner, also include secondary and tertiary electric locks.

Furthermore, a power drive unit 10, illustrated in FIG. 2, is coupled to the electromechanical handling members by one or more flexible transmission shafts.

This power drive unit 10 includes at least one rotary electric machine.

In one non-limiting example, the electromechanical handling members are driven by at least one electronic controller 20 of the ETRAS (Electrical Thrust Reverser Actuation Controller) type electrically connected to an engine control unit of the FADEC (Full Authority Digital Engine Control) type designed to control and monitor the corresponding turbojet engine.

In one alternative embodiment, they are driven directly by the FADEC.

This electronic controller 20 is a computer dedicated to the nacelle or a part thereof (movable element or specific handling member, for example), in particular designed to translate the opening or closing orders of the thrust reverser delivered by the FADEC into control sequences for the movable elements and the corresponding electromechanical handling members and, on the other hand, to inform the FADEC of the status of the handling members and the position of the movable elements.

More particularly, this electronic controller 20 includes a monitoring and control unit 30 capable of controlling the rotary electrical machine 10, using a computer and associated driving software.

The rotary electric machine 10 is a reversible alternator that operates in alternator mode, i.e. as an electric generator, and in start-up mode, i.e. as an electric motor to drive the corresponding electromechanical handling members by means of transmission shafts.

This electric motor traditionally includes a stator surrounding a wound rotor, the assembly being mounted coaxially.

This motor may be of any known electric motor type and will not be described in detail hereafter.

It will be seen that, in light of the opening or closing time of the movable elements 3, 4 during thrust reversal, the motor 10 goes from the motor mode to the generator mode in direct jet and reversed jet operation of the thrust reverser device 2, i.e. when the movable elements 3, 4 go from a closed position to an open position and vice versa.

In one embodiment, the change of mode of the electric motor 10 is detected by the control unit 30 through sign inversion of the current of the terminals of the electric motor 10.

It should be noted that this change takes place for two different predetermined current value levels in direct jet and reversed jet operation of the thrust reverser device 2.

These current values in particular depend on the type of thrust reversal done.

Furthermore, the electrical power circuit of the aircraft includes an electrical power supply unit connected to at least one electrical power supply inlet 130.

This is a unit designed primarily to manage the electrical power supply of the electrical devices of the nacelle 1 and, in particular, the handling members of the movable elements 3, 4 of the thrust reverser 2 and the electric motor 10.

This unit is connected to the monitoring and control unit 30 by an electrical power supply bus 101.

It includes one or more electrical power supply inlets 130 connected via a line 131 to the electrical system 130 of the aircraft.

The electrical power supply unit may thus receive an alternating input voltage, typically of 115 V, coming from the system, or a low direct voltage of 28 V.

It may also receive direct voltage directly from the cockpit, typically 350 V.

In the event the electrical system of the aircraft uses alternating current, the electrical power supply unit performs the rectification and filtering of that current to deliver a direct voltage to the control and monitoring unit 30 of the motor 10, via the power supply bus 101.

The electric power supply unit converts and thus adapts the electrical signal coming from the airplane system to provide a regulated direct voltage (one goes from 115 V to a direct voltage of approximately 270 V DC) in order to power the electric motor 10 of the handling members of the thrust reverser device 2.

Furthermore, the electrical power supply unit may also, if necessary, control a discharge resistance of the electric motor(s) of the nacelle 1.

According to the disclosure, as illustrated in FIG. 2, the electric power supply circuit also includes a system for recovering the braking energy 100 of the electric motor 10 when it is in generator mode during movement of the movable elements 3, 4 toward their closed position and/or their open position in direct jet and reversed jet operation of the thrust reverser device 2.

The system for recovering the braking energy 100 includes two parallel electrical circuits 110, 120, respectively called the primary circuit 110 and secondary circuit 120, the two circuits 110, 120 being connected to the power supply bus 101 and the ground M.

The primary circuit 110 includes at least one electrical energy storage device 112 mounted between the ground M and a primary switch 111 adapted to connect the electric motor 10 to the energy storage device 112.

Advantageously, the electrical energy storage device 112 may be made up of a capacitor, a supercapacitor, or a dual-layer capacitor made up of capacitive cells in series, or an ultracapacitor, the supercapacitor and the ultracapacitor having a more significant energy storage characteristic than a traditional capacitor.

The voltage power supply inlet 130 of the airplane system is also connected in the primary circuit 110, said voltage being rectified and filtered beforehand by suitable means present in the electrical power supply unit.

In one embodiment of the present disclosure, the secondary circuit 120 includes elements identical to those of the primary circuit 110.

It thus includes a secondary switch 121 and a secondary storage device 122, one terminal of which is connected to the ground and another terminal of which is connected to the switch 121.

The secondary switch 121 is thus adapted to connect the electric motor 10 to the energy storage device 122.

One embodiment of a logic control circuit of the control and monitoring unit 30 of the electric motor 10 is as follows.

The control and monitoring unit 30 of the electric motor 10 of the thrust reverser device 2 is capable of managing a so-called motor control circuit as well as two so-called braking energy recovery and braking energy restoration control circuits.

It should be noted that the control and monitoring unit 30 associates an inverter 31 with the electric motor 10.

This inverter 31 is a rectifier bridge that makes it possible to rectify the alternating current of the rotor of the motor 10, which also serves as a control bridge for the phases of the alternator.

At the end of travel of the movable elements 3, 4 of the thrust reverser device 2 during their direct jet or reversed jet movement, when the motor 10 goes into the generator mode, the control and monitoring unit controls the braking energy recovery circuit, i.e. it drives the inverter so that it causes the motor to operate in generator mode and it controls the storage of the braking energy from the motor 10 in the secondary energy storage device 122.

To that end, the switch 111 of the primary circuit is moved into a position making it possible to open the primary circuit 110.

Furthermore, it causes a change in the position of the secondary switch 121, which moves so as to close the circuit of the secondary energy storage device 122, indicated in broken lines in FIG. 2.

The motor 10 being disconnected from the power supply system 130 at that time, the voltage on the terminals of the motor 10 increases up to an admissible value, and the secondary energy storage device 122 is charged for the duration of the braking period of the motor.

The recovery of the residual braking energy of the motor 10 of the thrust reverser device 2 is thus ensured. This energy may then advantageously be reused as a driving energy source, as will be seen later.

The secondary energy storage device 122 is charged up to its maximum charge, which is monitored by the monitoring software of the control and monitoring unit 30.

In one possible alternative embodiment of the present invention, if the charge of the secondary energy storage device 122 is maximal, the monitoring and control unit can control a residual energy restoration and heat dissipation circuit.

It should be noted that, in a second alternative embodiment, the energy storage devices are dimensioned so as to bear all of the phases of the thrust reverser device without calling on a related discharge system.

The monitoring and control unit causes the position of the secondary switch 121 to change, the latter part moving so as to close the circuit of the secondary energy storage device 122, indicated in solid lines in FIG. 2.

The power unit then returns the residual energy into a discharge resistance to dissipate the residual energy.

It should be noted that as long as the secondary energy storage device 122 has not reached its maximum load, the energy restoration circuit is not commanded.

This offers the advantage of improving the recovery of the braking energy from the motor 10 for the subsequent movements of the movable elements 3, 4.

In direct jet or reversed jet operation, when the rotary electric machine 10 goes into the motor mode, that mode being detected by reading of the current of the terminals of the motor 10 by the monitoring software, the monitoring and control unit controls the motor circuit, i.e. it commands the consumption of the electrical energy stored in the primary 112 and secondary 122 energy storage devices.

To that end, it causes a change in the position of the primary switch 111 such that the primary circuit is closed.

It commands the discharge of the primary 112 and secondary 122 energy storage devices according to a particular driving law taking into account the upper and lower charge/discharge thresholds of the energy storage devices and/or the time constants to supply or recover energy, for example.

Furthermore, the discharge of the primary energy storage device 112 may occur before or after that of the secondary energy storage device 122.

The driving law is such that it offers the advantage of restricting excessive current pumping problems as well as thermal heating.

Thus, advantageously, the control system has additional energy in addition to that coming from the electrical power supply inlet, and in particular from the airplane system 130.

The stored braking energy being discharged before the withdrawal of energy on the airplane system, that withdrawal is decreased, and the management of the electrical energy of the nacelle is thus improved.

In a subsequent step of the logic control circuit of the control and monitoring unit 30, depending on the level of energy necessary for the subsequent motor phases of the rotary electric machine 10, the control and monitoring unit 30 may command charging the primary storage device 112 using the energy from the airplane system 130.

Furthermore, in one alternative embodiment of the present invention, at the end of the closing travel of the movable elements 3, 4 and relocking of the device, the control and monitoring unit may order evacuating the residual braking energy of the motor 10 in the generator mode that should have been stored in the primary and secondary energy storage devices 112 and 122.

It thus controls a residual braking energy dissipation circuit in the windings of the electric motor.

In fact, on the ground, the duration is sufficient to perform the dissipation gradually.

Owing to such a step during which the phases of the rotary electric machine are used in the generator mode to dissipate the energy, the internal operating temperature of the electronic controller 20 does not rise, which improves the reliability of that controller.

Furthermore, this also makes it possible to do away with a mechanical motor brake of the device that was used to cover cases of overspeeds of the device inasmuch as the speed of the motor 10 is regulated through better management of the energy in energy storage devices 112, 122.

One skilled in the art will appreciate, in relation to the control systems for electric devices of the nacelle of the prior art, a control system making it possible to limit the power withdrawn from the airplane system and increase the overall energy efficiency of the reverser.

The control system according to the invention has significant power resources that are immediately available and adapts perfectly to short usage cycles, such as those of a thrust reverser.

Furthermore, the control system according to the invention makes it possible to smooth the electrical power levels to absorb any power peaks.

In fact, such a control system makes it possible to have a close energy source; therefore, in the event power is needed quickly, more time is available given the proximity of the source.

One thus avoids excessive drifts of the current in relation to the time (di/dt) over the entire chain, but only on the local monitoring loop (whereas otherwise there are significant di/dt over all stages, therefore the rectification/interface stage of the electrical system of the aircraft) or these di/dt are dimensional and pose significant ElectroMagnetic Compatibility (EMC) problems.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A control system for controlling an electrical thrust reverser device of a nacelle of an aircraft, said thrust reverser device comprising at least one element that is movable to a closed position in direct jet operation of the thrust reverser device and an open position in reversed jet operation of the thrust reverser device, the control system including at least one electromechanical member for actuating said movable element, a unit for electrically driving said electromechanical actuation member, and a controlling and monitoring unit for controlling the electrical drive unit so as to move the movable element to the closed position in direct jet operation of the thrust reverser device and/or the open position in reversed jet operation of the thrust reverser device, characterized in that the control system includes a braking energy recovery system for recovering braking power from said electrical drive unit during the movement of the movable element to the closed position in direct jet operation of the thrust reverser device and/or the open position in reversed jet operation of the thrust reverser device.

2. The control system according to claim 1, characterized in that the braking energy recovery system includes at least one electrical circuit including an electrical storage device connected to the electrical drive unit.

3. The control system according to claim 2, characterized in that the braking energy recovery system includes two electrical circuits each including at least one electrical storage device connected to the electrical drive unit.

4. The control system according to claim 2, characterized in that each circuit also includes a switch with two states, one of the two states being adapted to connect the electrical drive unit to the energy storage device.

5. The control system according to claim 2, characterized in that the electrical energy storage device is one of a capacitor, a supercapacitor, and an ultracapacitor.

6. The control system according to claim 3, characterized in that the controlling and monitoring unit is capable of controlling a braking energy recovery circuit as long as the maximum load of the energy storage devices is not reached, and controlling a braking energy dissipation circuit when the maximum load of the energy storage devices is reached.

7. The control system according to claim 3, characterized in that the controlling and monitoring unit is capable of controlling a drive circuit in which the stored braking energy is discharged before an electrical withdrawal on an external electrical power supply system.

8. The control system according to claim 3, characterized in that the controlling and monitoring unit is capable of controlling a residual braking energy dissipation circuit.

9. The system according to claim 1, characterized in that the electrical device is a thrust reverser device.

10. A nacelle including at least one electrical thrust reverser device and control system according to claim 1.

11. A control method implemented by a control system according to claim 1, including a step in which the electrical braking energy is recovered from the electrical drive unit during the movement of the movable element to the closed position in direct jet operation of the thrust reverser device and/or the open position in reversed jet operation of the thrust reverser device.

* * * * *